US012661976B2

(12) United States Patent
Mitidieri et al.

(10) Patent No.:  US 12,661,976 B2
(45) Date of Patent:     Jun. 23, 2026

(54) EXTRUDED FLAP FOR A DEVICE FOR SHUTTING OFF AN AIR INLET OF A MOTOR VEHICLE FRONT END

(71) Applicant: VALEO SYSTEMES THERMIQUES, La Verriere (FR)

(72) Inventors: Enzo Mitidieri, La Verriere (FR); Laura Marion, La Verriere (FR)

(73) Assignee: VALEO SYSTEMES THERMIQUES, LaVerriere (FR)

( * ) Notice: Subject to any disclaimer, the term of this patent is extended or adjusted under 35 U.S.C. 154(b) by 424 days.

(21) Appl. No.: 18/558,661

(22) PCT Filed: Apr. 12, 2022

(86) PCT No.: PCT/EP2022/059812
§ 371 (c)(1),
(2) Date: Nov. 2, 2023

(87) PCT Pub. No.: WO2022/233548
PCT Pub. Date: Nov. 10, 2022

(65) Prior Publication Data
US 2024/0227545 A1     Jul. 11, 2024

(30) Foreign Application Priority Data

May 3, 2021     (FR) ...................................... 2104654

(51) Int. Cl.
*B60K 11/08*     (2006.01)
*B60H 1/00*      (2006.01)
(52) U.S. Cl.
CPC ........ *B60K 11/085* (2013.01); *B60H 1/00678* (2013.01)

(58) Field of Classification Search
CPC ......... B60K 11/085; F24F 13/14; F24F 13/15; B60H 1/00678
See application file for complete search history.

(56) References Cited

U.S. PATENT DOCUMENTS 9,662,963 B2      5/2017   Schneider
10,100,707 B2    10/2018   Wolf et al.

FOREIGN PATENT DOCUMENTS

DE          10008099 A1      9/2001
DE      102017119098 A1      2/2019
(Continued)

OTHER PUBLICATIONS

European Patent Office, International Search Report (with English translation) and Written Opinion of corresponding International Application No. PCT/EP2022/059812, dated Aug. 2, 2022.
(Continued)

*Primary Examiner* — Timothy Hannon
(74) *Attorney, Agent, or Firm* — VALEO SYSTEMES THERMIQUES

(57)     ABSTRACT
A flap including a flap with a front wall and a rear wall, the rear wall including a groove extending concentrically to the axis of rotation of the flap, the front wall and the rear wall being connected edge to edge and delimiting an inner cavity, the flap further including an end piece at each of the ends of the flap body, the end pieces including an inner part inserted into the cavity of the flap body and an outer part protruding from the flap body, at least one end piece including a hooking finger projecting from the end piece along the axis of rotation and being inserted within the groove, the hooking finger including at least one tooth intended to be implanted within the groove, the tooth being oriented so as to oppose the extraction of the end piece from the flap body.

10 Claims, 3 Drawing Sheets

(56)           References Cited

FOREIGN PATENT DOCUMENTS

| | | | |
|---|---|---|---|
| FR | 3094284 | A1 | 10/2020 |
| WO | 2011009212 | A1 | 1/2011 |
| WO | 2018067288 | A1 | 4/2018 |
| WO | 2019166729 | A1 | 9/2019 |
| WO | 2021074506 | A1 | 4/2021 |

OTHER PUBLICATIONS

Japan Patent Office, Office Action (with English translation) of corresponding Japanese Patent Application No. 2023-568138, dated Oct. 29, 2024.

EXTRUDED FLAP FOR A DEVICE FOR SHUTTING OFF AN AIR INLET OF A MOTOR VEHICLE FRONT END

TECHNICAL FIELD

The present invention relates to a flap for a shutter device, and more specifically a device for shutting off an air inlet of a motor vehicle front end.

BACKGROUND OF THE INVENTION

Motor vehicle front ends are generally made up of two main air inlets, referred to as the top route and the bottom route, that are separated by a bumper beam. The heat exchangers of the motor vehicle, such as the one used for the passenger compartment air conditioning and/or the one used for cooling the engine, for example, are generally placed behind this bumper beam.

It is also known practice to arrange, in the path of air passing through the main air inlets, more generally the bottom route, a support frame comprising a multiplicity of flaps that are mounted so as to pivot about parallel axes and are able to assume a multiplicity of different angular positions, between an open position and a shut-off position, under the action of a suitable controller.

A shutter device resembling a louver blind is thus obtained that makes it possible to adjust the flow rate of air passing through the air inlets and arriving at the heat exchangers. It is thus possible to optimize the effectiveness of these heat exchangers as necessary by varying the amount of air they receive. In addition, at high speed, the flaps in the shut-off position make it possible to reduce the drag coefficient of the vehicle and thus improve the aerodynamics of said vehicle.

The flaps of such shutter devices can in particular comprise an extruded flap body, arranged at the ends of which are end pieces that allow the connection to the support frame. However, in order for these end pieces to remain in place inside the flap body, or in order to prevent the end pieces from damaging the flap body when they are put in place, reduced manufacturing tolerances are necessary. This production quality is difficult to achieve and very costly due to the materials and dimensions of the components.

BRIEF SUMMARY OF THE INVENTION

One of the aims of the present invention is therefore to overcome at least some of the drawbacks of the prior art by proposing a flap comprising an improved connection between the flap body and the end pieces.

The present invention therefore relates to a flap for a device for shutting off an air inlet of a motor vehicle front end, said flap comprising a profiled flap body that has an oblong shape, is obtained by extrusion and extends along its axis of rotation, said flap body comprising a front wall, which is intended to be arranged in opposition to an air flow when the flap is in a closed position, and a rear wall, which is opposite the front wall and is intended to be connected to at least one retaining device borne by the shutter device, the rear wall comprising a groove extending concentrically to the axis of rotation of the flap, the front wall and rear wall being connected edge to edge and delimiting an inner cavity, said flap also comprising an end piece at each of the ends of the flap body, said end pieces comprising an inner portion inserted into the cavity in the flap body and an outer portion that extends beyond said flap body, at least one end piece comprising a hooking finger, said hooking finger protruding from the end piece along the axis of rotation and being inserted within the groove in the rear wall, said hooking finger comprising at least one tooth that is intended to be embedded within said groove, said tooth being oriented so as to prevent the end piece from being removed from the flap body.

According to one aspect of the invention, the free end of the hooking finger comprises a chamfer that is oriented so as to make it easier for said hooking finger to be inserted into the groove.

According to another aspect of the invention, the flap body comprises, within its cavity, a central reinforcing wall extending along the axis of rotation and connecting the inner face of the inner wall to the inner face of the outer wall, said central wall dividing the central channel in two, the inner portion of the end piece comprising a slot for the insertion of said central wall.

According to another aspect of the invention, the central wall is arranged vertically in alignment with the groove so as to connect the bottom of said groove to the front wall.

According to another aspect of the invention, the inner portion of the end piece comprises at least one support point on each of the inner faces of the outer walls forming the flap body.

According to another aspect of the invention, the inner portion of the end piece has a cross section whose shape is complementary to the shape of the cavity in the flap body.

According to another aspect of the invention, the inner portion of the end piece comprises blind recesses that face the inner faces of the outer walls when mounted in the flap body.

According to another aspect of the invention, the thickness of the sections forming the inner portion of the end piece varies by a value of less than 15% from one section to another.

According to another aspect of the invention, the end piece comprises, between its inner portion and its outer portion, a collar protruding perpendicular to the axis of rotation of the flap, said collar closing off the end of the flap body.

According to another aspect of the invention, the flap comprises, at a first of its ends, an end piece comprising, on its outer portion, a pivot axis, which is concentric with the axis of rotation, and, at a second end, an end piece comprising a pivot axis, which is concentric with the axis of rotation, and a control arm.

BRIEF DESCRIPTION OF THE DRAWINGS

Other features and advantages of the invention will become more clearly apparent upon reading the following description, which is given by way of illustrative and non-limiting example, and the appended drawings, in which.

DETAILED DESCRIPTION OF THE INVENTION

In the various figures, identical elements bear the same reference signs.

The following embodiments are examples. Although the description refers to one or more embodiments, this does not necessarily mean that each reference relates to the same embodiment, or that the featuress apply only to one single embodiment. Individual features of different embodiments can also be combined or interchanged to provide other embodiments.

In the present description, certain elements or parameters can be given ordinal numbers such as, for example, first element or second element, as well as first parameter and second parameter or even first criterion and second criterion, etc. In this case, this ordinal numbering is simply to differentiate between and denote elements or parameters or criteria that are similar but not identical. This ordinal numbering does not imply any priority of one element, parameter or criterion over another and such numbering can easily be interchanged without departing from the scope of the present description. Likewise, this ordinal numbering does not imply any chronological order, for example, in assessing any given criteria.

Figures 1, 2:
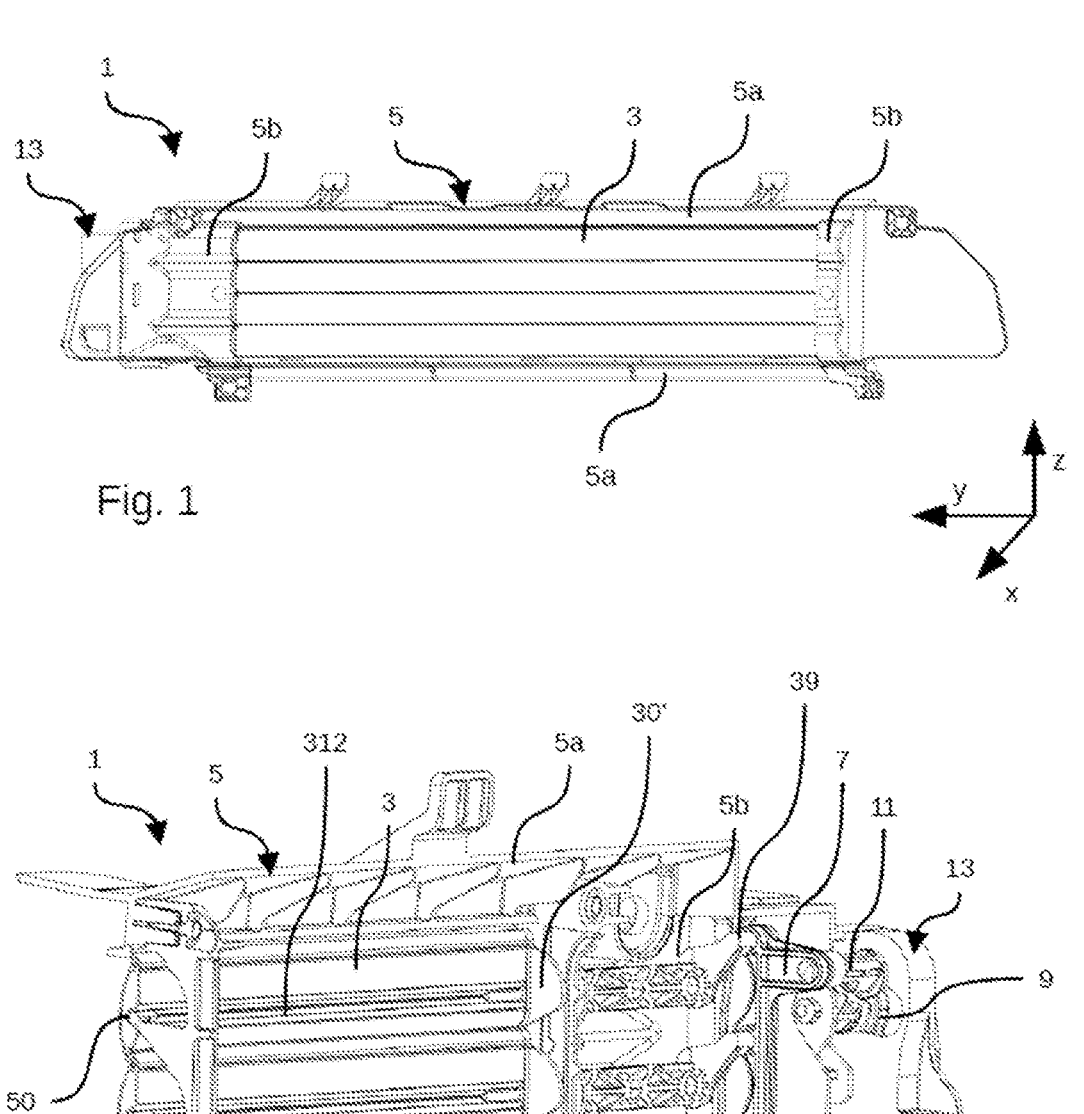
FIG. 1 shows a schematic front-perspective depiction of a shutter device in the shut-off position.
FIG. 2 shows a schematic perspective depiction of a control element.

In FIGS. 1 and 2, an XYZ trihedron is used in order to show the viewing angle of each of said figures relative to one another. The axes of this trihedron can also correspond to the various orientations of the motor vehicle. The X axis can thus correspond to the axis of the length of the vehicle, the Y axis to the axis of its width and the Z axis to that of its height.

FIG. 1 shows a schematic perspective depiction of a shutter device in the shut-off position. This FIG. 1 more exactly shows the outer face of said shutter device 1, i.e. the face directed toward the outside of the motor vehicle.

Said shutter device 1 comprises a support frame 5 comprising in particular two longitudinal crossmembers 5*a*, extending parallel to the Y axis of the trihedron, and at least two lateral uprights 5*b*, extending parallel to the Z axis of the trihedron and connecting said longitudinal crossmembers 5*a*. Advantageously, the support frame 5 is made from plastics material and the two longitudinal crossmembers 5*a* and the at least two lateral uprights 5*b* are obtained by injection molding. In order to improve the stiffness of said support frame 5, the latter can be molded as a single component.

One or more flaps 3 are installed inside said support frame 5. When there is a plurality of flaps 3, the latter form rows of flaps 3 that are mutually parallel and form a set of flaps 3. In the example illustrated in FIG. 1, the shutter device 1 comprises a set of flaps 3. A control module 13 is placed at one of the ends of the set of flaps 3 so as to allow said flaps 3 to synchronously rotate about a pivoting axis A. This rotation takes place between an open position (not shown), in which the flaps 3 are arranged such that an air flow can pass through the shutter device 1, in particular inside the support frame 5, and a closed position, illustrated in FIG. 1, in which the flaps 3 are arranged such that an air flow cannot pass through the shutter device 1.

In the example shown in FIG. 1, the control module 13 is arranged on a lateral upright 5*b*. It is nevertheless entirely conceivable for the control module 13 to be arranged in the opening in the support frame 5 that connects the longitudinal crossmembers 5*a* and for the shutter device 1 to comprise a set of flaps 3 on either side of the control module 13.

As shown in FIG. 2, the control element 13 has in particular a rod 7. The flaps 3 comprise a control arm 39 that is perpendicular to their pivoting axis A and bears a connection stud along a connection axis B. The connection stud allows the connection between the flap 3 and the rod 7. The pivoting axis A and the connection axes B are not coincident and are both parallel to the Y axis of the trihedron.

The control module 13 also comprises an actuator 9. The actuator 9 can be electric, such as an electric motor, for example, or pneumatic, such as a pneumatic cylinder, for example. By pivoting a lever 11, said actuator 9 applies a translational movement to the rod 7 along the Z axis of the trihedron.

The flaps 3 can each pivot about a pivoting axis A defined by their connection to the support frame 5. The connection studs between the flaps 3 and the control rod 7 are off-center relative to the pivoting axes A such that a translational movement of the control rod 7 parallel to the Z axis of the trihedron, under the action of the actuator 9, causes the flaps 3 to pivot about their respective pivoting axes A and therefore causes said flaps 3 to pass from one position to another. Since the flaps 3 are connected to the same rod 7, the passage from an open position to a closed position is synchronous for all of said flaps 3.

The support frame 5 also comprises one or more retaining devices 5*c*. These retaining devices 5*c* are more particularly arranged in the opening in the support frame 5 and connect the longitudinal crossmembers 5*a*. The retaining devices 5*c* are more particularly arranged behind the flaps 3. The retaining devices 5*c* also comprise retaining members 50 that are inserted into a groove 312 formed in the flaps 3 concentrically to their axes of rotation A. These retaining devices 5*c* allow the flaps 3 to have a support point in order to maintain a rectilinear shape and not to buckle under their own weight, in particular if they are very long.

Figure 3:
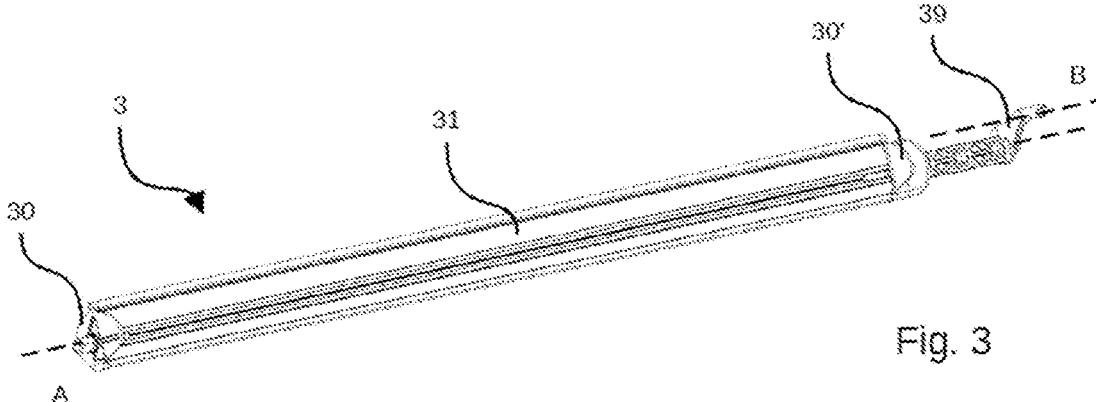
FIG. 3 shows a schematic perspective depiction of a flap.

As shown in FIG. 3, a flap 3 comprises a profiled flap body 31 that has anoblong shape, is obtained by extrusion and extends along its axis of rotation A. The cross section of the flap body 31 can more particularly have a substantially oval profile (see FIG. 4).

End pieces 30, 30' are arranged at each end of the flap body 31. In the present case, reference is made to the ends of the flap body 31 in the longitudinal direction. These end pieces 30, 30' make it possible in particular to close off the flap body 31 obtained by extrusion and also allow the flap 3 to be connected to the support frame 5 and the control module 13. The end piece 30' intended to be connected to the control module 13 comprises in particular the control arm 39 that allows the connection to the rod 7 (see FIGS. 2 and 3).

Figure 4:
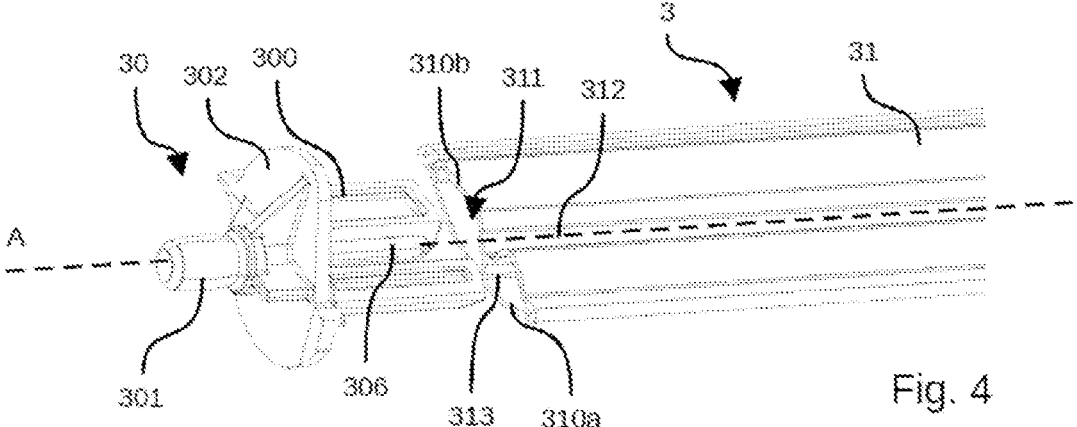
FIG. 4 shows a schematic exploded perspective depiction of one end of a flap.

As shown in FIG. 4, the flap body 31 comprises a front wall 310*a* and a rear wall 310*b*, which are connected edge to edge and delimit an inner cavity 311. The front wall 310*a* is in particular intended to be arranged in opposition to an air flow when the flap 3 is in a closed position, as illustrated in FIGS. 1 and 2. The rear wall 310*b*, which is opposite the front wall 310*a*, for its part comprises the groove 312 that allows the connection to at least one retaining device 5*c* borne by the shutter device 1 (shown in FIG. 2). These two outer walls 310 more exactly form the outer structure of the flap body 31. Because the flap body 31 is produced by extrusion, the inner cavity 311 extends over the entire length thereof.

The end pieces 30, 30' comprise an inner portion 300 inserted into the cavity 311 in the flap body 31 and an outer portion 301 that extends beyond said flap body 31. The end pieces 30, 30' can also comprise, between their inner portion 300 and their outer portion 301, a collar 302 protruding perpendicular to the axis of rotation A of the flap 3. This collar 302 in particular closes off the end of the flap body 31. The collar 302 also makes it possible to protect the support frame 5 and the control module 13 from water or dust that could reach the flap body 31.

At a first end of the flap body 31 illustrated in FIG. 4, the flap 3 comprises in particular an end piece 30 comprising, on its outer portion 301, a pivot axis, which is concentric with the axis of rotation A and intended to interact with a bearing borne by the support frame 5. At a second end of the flap body 31 (shown in FIG. 2), the flap 3 comprises another end piece 30' comprising a pivot axis, which is concentric with the axis of rotation A and intended to interact with a bearing borne by the control module 13, and the control arm 39. The end pieces 30, 30' are preferably made from plastics material by injection molding.

Figure 5:
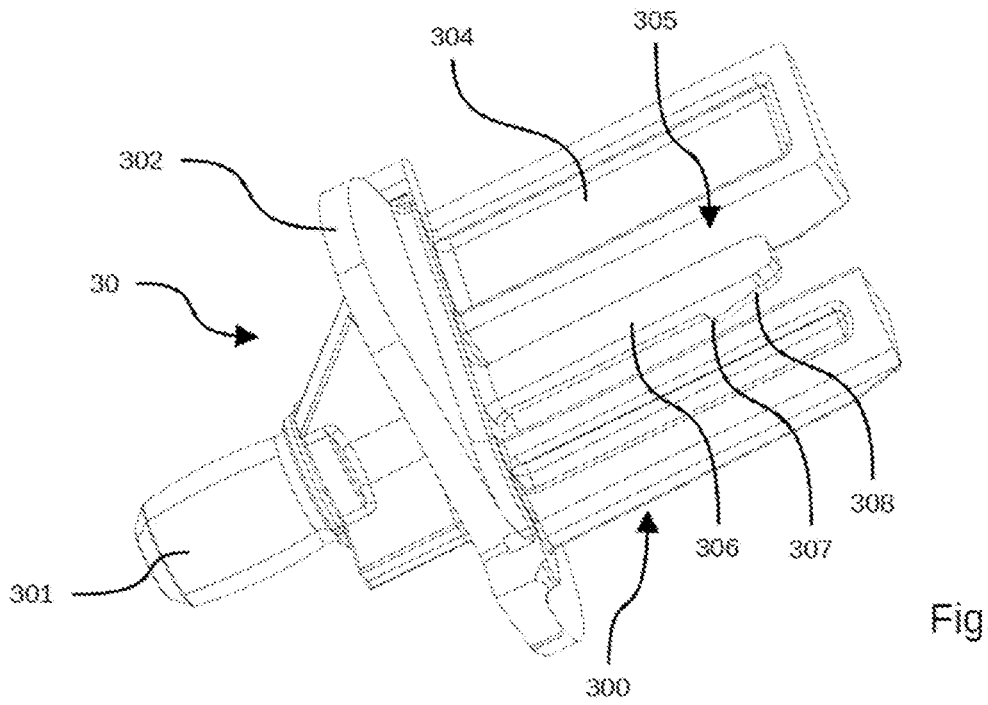
FIG. 5 shows a schematic perspective depiction of an end piece.
Figure 6:
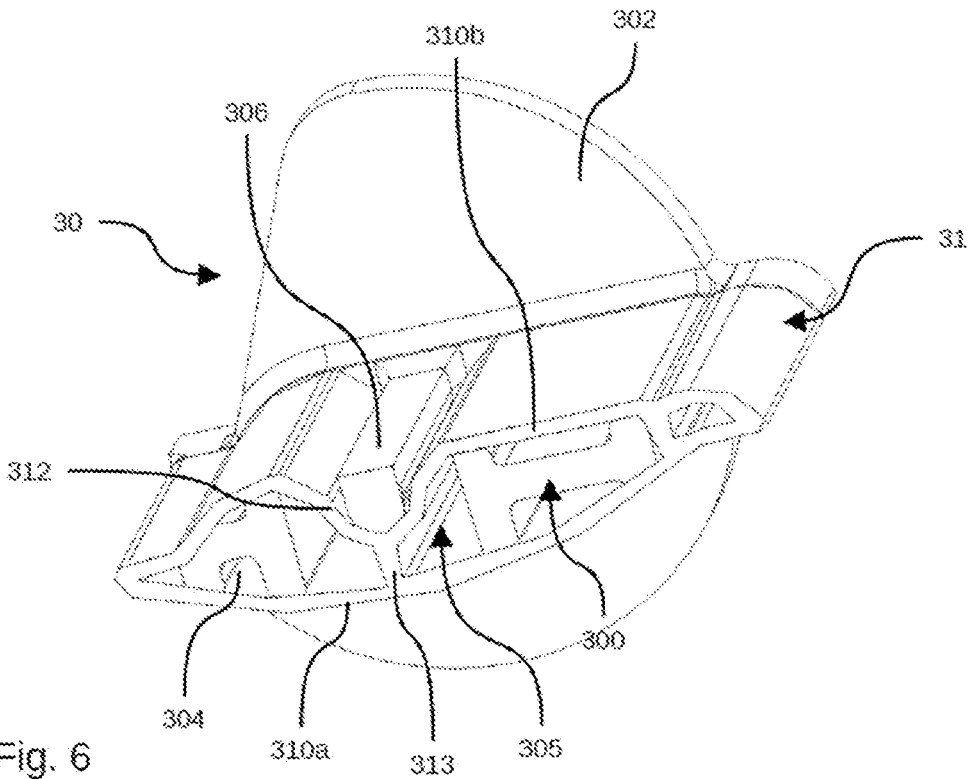
FIG. 6 shows a schematic perspective depiction in longitudinal cross section of one end of a flap.

As shown in more detail in FIGS. 4 to 6, the inner portion 300 of the end piece 30 also comprises a hooking finger 306. This hooking finger 306 protrudes from the end piece 30, 30' along the axis of rotation A and is inserted within the groove 312 in the rear wall 310b. The hooking finger 306 comprises at least one tooth 307 that is intended to come into contact with said groove 312. This tooth 307 is in particular oriented so as to prevent the end piece 30, 30' from being removed from the flap body 31. To this end, the tooth 307 can comprise a flat part, which is oriented perpendicular to the rear wall 310b and faces the outer portion 301. It is also conceivable for the rear wall 310b to comprise a bead or an orifice against which the tooth 307 comes into abutment when the end piece 30, 30' is mounted on the flap body 31. The hooking finger 30 can in particular be integral with the end piece 30. When the inner portion 300 of the end piece 30 is inserted into the cavity 311 in the flap body 31, the hooking finger 306 deforms as it enters the groove 312 in order to allow for easy insertion. When a pull-out force is applied to the end piece 30 in order for example to cause it to come out of the flap body 31, the tooth 306 hooks onto the rear wall 310b within the groove 312, holding the end piece 30 within the flap body 31. The free end of the hooking finger 306 can also comprise a chamfer 308 that is oriented so as to make it easier for said hooking finger 306 to be inserted into the groove 312 during mounting of the flap 3.

This hooking finger 306 allows a satisfactory connection between the end piece 30 and the flap body 31. This makes it possible to secure the end piece 30 within the cavity 311 in the flap body 31 and limits the risk of it becoming detached. In addition, the hooking finger, due to its deformation during mounting, allows greater manufacturing tolerances between the end piece 30 and the flap body 31 and easy insertion of the end piece 30 within said flap body 31.

The inner portion 300 of the end piece 30 can also comprise blind recesses 304 that face the inner faces of the outer walls 310 when mounted in the flap body 31. These recesses make it possible in particular to reduce the amount of material forming the end piece 30 and thus make it possible to reduce the weight thereof. The sections forming the inner portion 300 of the end piece 30 can in particular vary in thickness by a value of less than 15% from one section to another. This relatively constant thickness of the sections of the inner portion 300 also makes it possible for the end piece 30 to have relatively uniform thermal inertia.

The cavity 311, into which the inner portion 300 of the end piece 30 is inserted, can also comprise a central reinforcing wall 313 extending along the axis of rotation A, as illustrated in FIGS. 4 and 6. This central wall 313 divides the central channel of the cavity 311 in two. The central wall 313 also makes it possible to stiffen the flap body 31 and in particular to maintain the spacing between the outer walls 310. To this end, this central wall 313 connects more particularly the inner face of the inner wall 310b to the inner face of the outer wall 310a. More specifically, the central wall 313 can be arranged in vertical alignment with the groove 312 so as to connect the bottom of said groove 312 to the front wall 310a.

As shown in FIGS. 5 and 6, the inner portion 300 of the end piece 30 can in particular comprise a slot 305 for the insertion of said central wall 313 in order to allow the inner portion 300 to be inserted into the central orifice of the flap body 31. The hooking finger 306 can in particular be arranged within this insertion slot 305 when the central wall 313 is arranged in vertical alignment with the groove 312.

According to FIG. 6, the inner portion 300 of the end piece 30 can comprise at least one support point on each of the inner faces of the outer walls 310 forming the flap body 31. This allows the inner portion 300 in particular, and the end piece 30 more generally, to have just one degree of freedom along the axis of rotation A. This allows in particular a satisfactory rigid connection between the flap body 31 and the end piece 30. In order to strengthen this rigid connection and limit the movements of the end piece 30 within the flap body 31 as much as possible, the inner portion 300 of the end piece 30 can in particular have a cross section whose shape is complementary to the shape of the cavity 311 in the flap body 31.

In the example illustrated in FIGS. 4 to 6, only the end piece 30, which is inserted into the first end of the flap body 31, is shown and described. However, it is entirely conceivable for the inner portion 300 of either one, or even both, of the end pieces 30, 30' to be as described above.

It is thus clear that a satisfactory connection between the end piece 30 and the flap body 31 is made possible by the presence of the hooking finger 306 hooking onto the rear wall 310b of the flap 3 in the groove 306. This makes it possible to secure the end piece 30 within the cavity 311 in the flap body 31 and limits the risk of it becoming detached. In addition, the hooking finger 306, due to its deformation, allows greater manufacturing tolerances between the end piece 30 and the flap body 31 and easy insertion of the end piece 30 within said flap body 31.

What is claimed is:

1. A flap for a shutter device for shutting off an air inlet of a motor vehicle front end, comprising a profiled flap body that has an oblong shape, is extruded and extends along its axis of rotation, said profiled flap body including a front wall, which is intended to be arranged in opposition to an air flow when the flap is in a closed position, and a rear wall, which is opposite the front wall and is intended to be connected to at least one retaining device borne by the shutter device, the rear wall including a groove extending concentrically to the axis of rotation of the flap, the front wall and rear wall being connected edge to edge and delimiting an inner cavity, said flap further comprising an end piece at each of ends of the profiled flap body, said end pieces including an inner portion inserted into the cavity in the profiled flap body and an outer portion that extends beyond said profiled flap body, wherein at least one end piece of said end pieces includes a hooking finger, said hooking finger protruding from the end piece along the axis of rotation and being inserted within the groove in the rear wall, said hooking finger including at least one tooth that is intended to be embedded within said groove, said at least one tooth being oriented so as to prevent the at least end piece of said end pieces from being removed from the profiled flap body.

2. The flap as claimed in claim 1, wherein the free end of the hooking finger includes a chamfer that is oriented so as to make it easier for said hooking finger to be inserted into the groove.

3. The flap as claimed in claim 1, wherein the profiled flap body includes, within its cavity, a central reinforcing wall extending along the axis of rotation and connecting the inner face of the rear wall to the inner face of the front wall, said central wall dividing the central channel in two, the inner portion of the at least one end piece of the end pieces including a slot for the insertion of said central wall.

4. The flap as claimed in claim 3, wherein the central wall is arranged in vertical alignment with the groove so as to connect the bottom of said groove to the front wall.

5. The flap as claimed in claim 1, wherein the inner portion of the at least one end piece of the end pieces includes at least one support point on each of the inner faces of the front and rear walls forming the profiled flap body.

6. The flap as claimed in claim 5, wherein the inner portion of the at least one end piece of the end pieces has a cross section whose shape is complementary to the shape of the cavity in the profiled flap body.

7. The flap as claimed in claim 1, wherein the inner portion of the at least one end piece of the end pieces includes blind recesses that face the inner faces of the front and rear walls when mounted in the profiled flap body.

8. The flap as claimed in claim 7, wherein the thickness of sections forming the inner portion of the at least one end piece of the end pieces varies by a value of less than 15% from one section to another.

9. The flap as claimed in claim 1, wherein the at least one end piece of the end pieces includes, between its inner portion and its outer portion, a collar protruding perpendicular to the axis of rotation of the flap, said collar closing off an end of the profiled flap body.

10. The flap as claimed in claim 1, further comprising, at a first of its ends, one end piece of the end pieces including, on its outer portion, a pivot axis, which is concentric with the axis of rotation, and, at a second end, another end piece of the end pieces including a pivot axis, which is concentric with the axis of rotation, and a control arm.

* * * * *